(12) United States Patent
Suematsu et al.

(10) Patent No.: US 7,430,372 B2
(45) Date of Patent: Sep. 30, 2008

(54) OPTICAL TRANSMISSION SYSTEM

(75) Inventors: Mamoru Suematsu, Yokohama (JP); Akira Yamamoto, Yokohama (JP); Haruki Tanaka, Yokohama (JP); Hideaki Sugiya, Kawasaki (JP); Yuki Murakami, Kawasaki (JP); Hisayuki Ojima, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 678 days.

(21) Appl. No.: 11/141,470

(22) Filed: Jun. 1, 2005

(65) Prior Publication Data

US 2006/0188262 A1 Aug. 24, 2006

(30) Foreign Application Priority Data

Feb. 18, 2005 (JP) ............... 2005-042304

(51) Int. Cl.
*H04B 10/08* (2006.01)
*H04B 17/00* (2006.01)
(52) U.S. Cl. ........................................ 398/31
(58) Field of Classification Search ............ 398/25, 398/30, 34, 94
See application file for complete search history.

(56) References Cited

U.S. PATENT DOCUMENTS 6,832,020 B2 12/2004 Okada et al.
7,002,734 B2 * 2/2006 Horachi et al. ............ 359/341.4
7,330,651 B2 * 2/2008 Yamashita .................. 398/25
2003/0231376 A1 12/2003 Horachi et al.

FOREIGN PATENT DOCUMENTS

WO    WO 98/35259    8/1998

* cited by examiner

*Primary Examiner*—Shi K Li
(74) *Attorney, Agent, or Firm*—Staas & Halsey LLP

(57) ABSTRACT

An optical transmission system is provided which is capable of booting the system by using an ASE (Amplified Spontaneous Emission) light in a manner to provide high quality. A pre-amplifier receives noise light and does gain setting in an amplifier booting mode and receives an optical signal and to amplify the received signal in a working mode. A variable dispersion compensator is placed in a preceding-stage of the pre-amplifier and makes compensation of dispersion of a wavelength occurring when an optical signal propagates through an optical fiber in a variable manner. A switching unit to select, when the noise light passes through the variable dispersion compensator, if a level of the noise light is deviated from a desired level, a bypass route so as to make the noise light not be input to the variable dispersion compensator but be input to the pre-amplifier in an amplifier booting mode according to a switching instruction and to select a passage route so as to make the optical signal, after having been input to the variable dispersion compensator and having undergone dispersion compensation, be input to the pre-amplifier according to the switching instruction in a working mode.

12 Claims, 15 Drawing Sheets

| PARAMETER | CONTENTS | UNIT | TEMPORARY SET VALUE |
|---|---|---|---|
| PD1in | INPUT LIGHT LEVEL OF PD1 | dBm | — |
| PD1in $_{AGC}$ | INPUT LIGHT LEVEL OCCURRING WHEN POST-AMPLIFIER 11 OUTPUTS ASE LIGHT | dBm | 1 |
| PD1in $_{ASE}$ | INPUT LIGHT LEVEL OCCURRING WHEN POST-AMPLIFIER 11 OUTPUTS ASE LIGHT | dBm | 1 |
| PD1 $_{LOSS}$ | AMOUNT OF LIGHT LOSS IN PD1 | dB | 0.5 |
| BRANCH LOSS | AMOUNT OF LIGHT LOSS CAUSED BY BEING BRANCHED IN COUPLER C2 | dB | 3 |
| COUPLER LOSS | AMOUNT OF LIGHT LOSS IN COUPLER C2 | dB | 0.5 |
| VIPA TRANSMISSON WAVELENGTH LOSS $_{WDM}$ | AMOUNT OF LIGHT LOSS DEPENDING ON TRANSMISSION WAVELENGTH OF ONE WAVE OF WDM SIGNAL | dB | 1 |
| VIPA TRANSMISSON WAVELENGTH LOSS $_{ASE}$ | AMOUNT OF LIGHT LOSS DEPENDING ON TRANSMISSION WAVELENGTH OF ASE LIGHT | dB | 5 |
| VIPA LOSS | AMOUNT OF LIGHT LOSS IN VIPA 22 | dB | 0.5 |
| X | PARAMETER | dB | 0 |

FIG. 10

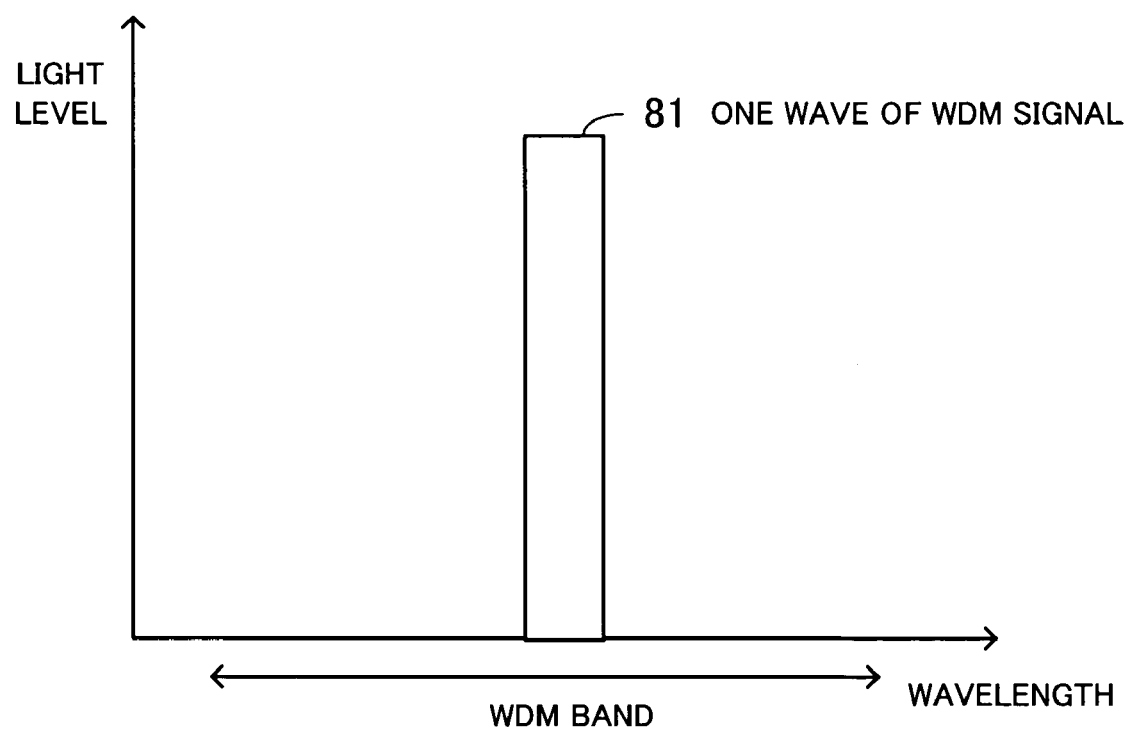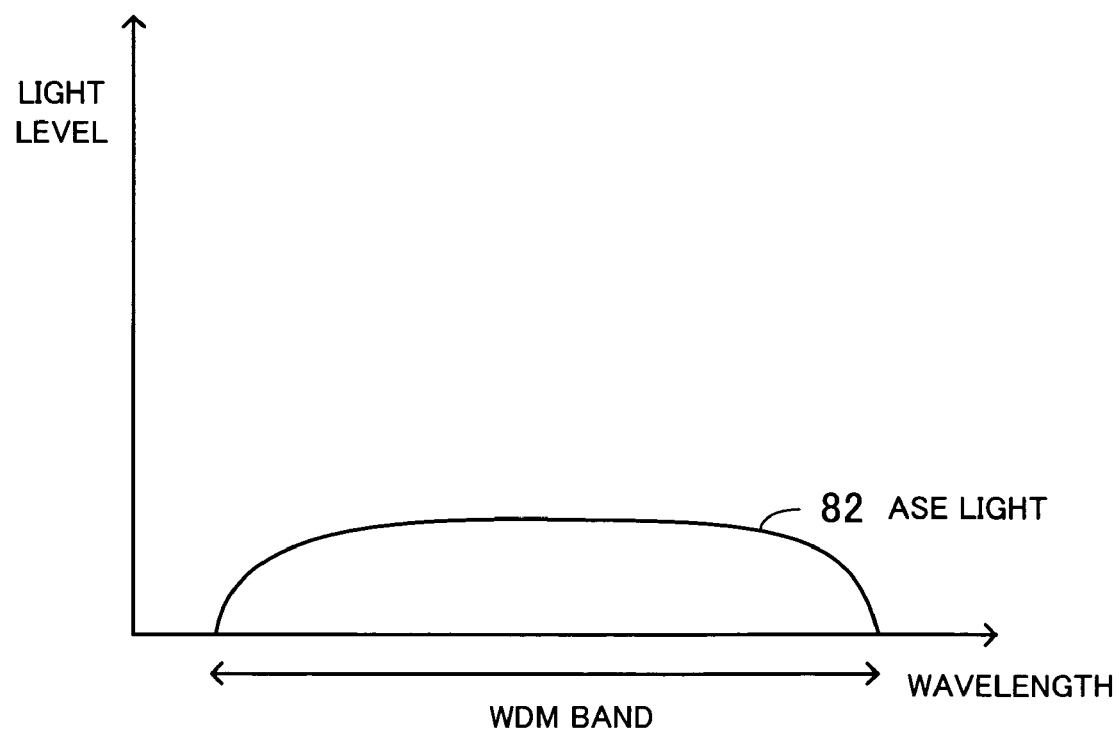
FIG. 14

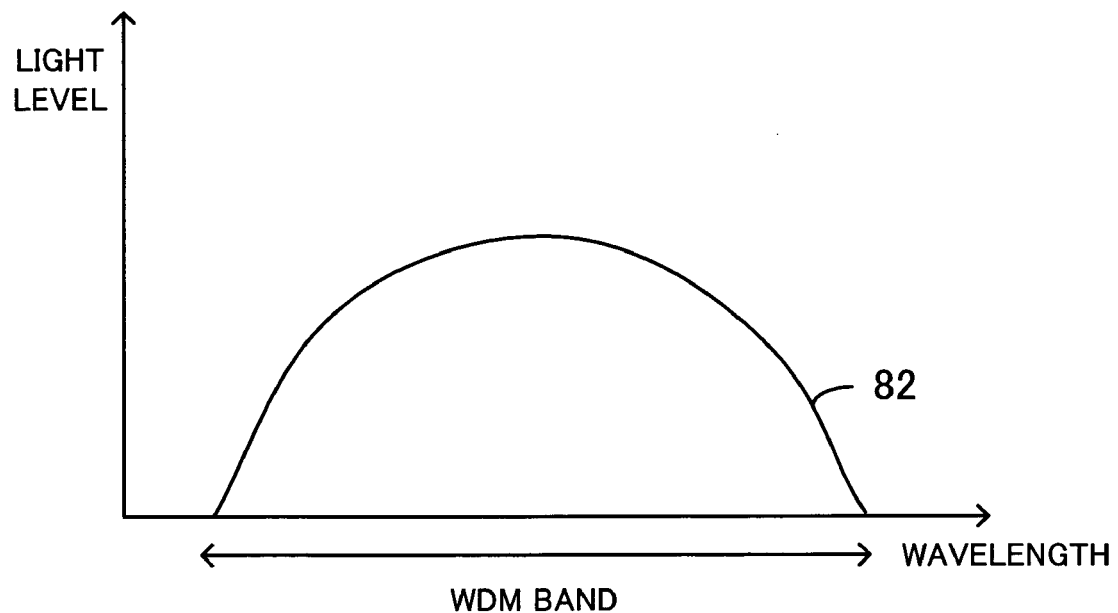
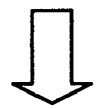 PASSAGE THROUGH VIPA
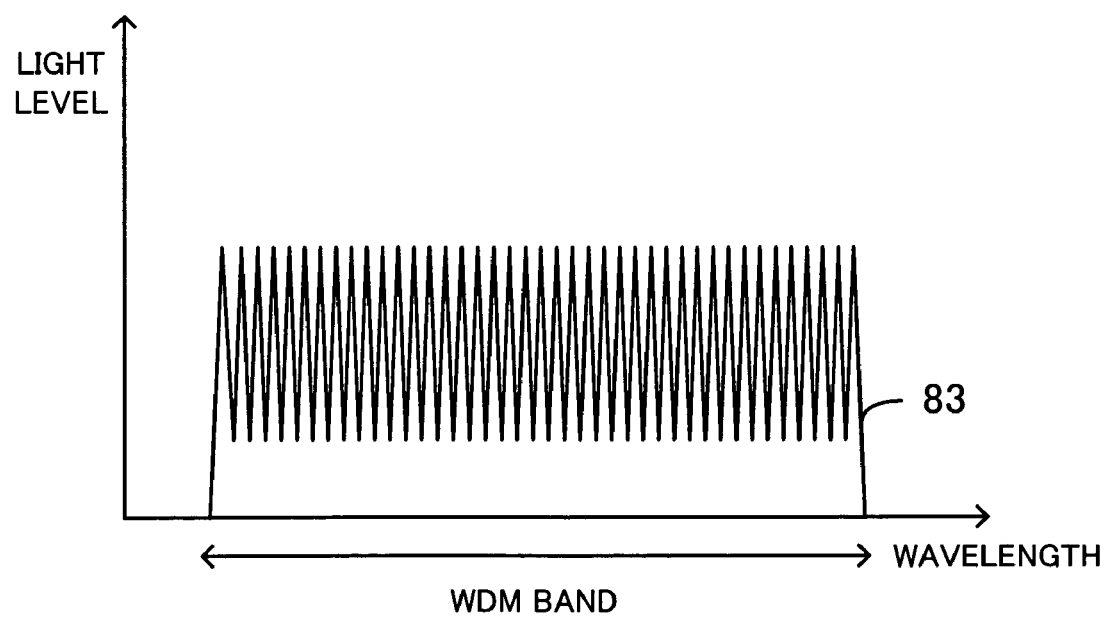
FIG. 15

OPTICAL TRANSMISSION SYSTEM

CROSS-REFERENCE TO RELATED APPLICATIONS

This application is based on, and claims priority to, Japanese Application No. 2005-042304, filed Feb. 18, 2005, the entire contents of which are incorporated herein by reference.

BACKGROUND OF THE INVENTION

1. Field of the Invention

The present invention relates to an optical transmission system and particularly to the optical transmission system to transmit an optical signal according to a WDM (Wavelength Division Multiplex) method.

2. Description of the Related Art

In recent years, as demands for communication using broadband service provided by the Internet increases, transmission distance is made longer and transmission capacity is made larger in an optical communication network, and research and development of such a WDM (Wavelength Division Multiplex) transmission method, in which light having a different wavelength is multiplexed and a plurality of signals is simultaneously transmitted by one piece of an optical fiber, as can achieve high speed transmission and large capacity exceeding 40 Gbps are progressing. On the other hand, since transmission speed of optical signals by optical fibers differs in every wavelength of light, chromatic dispersion causing a pulse waveform of light to be blunt occurs as transmission distance of light increases. In the WDM system to achieve large-capacity and long-distance optical transmission, pulse expansion caused by chromatic dispersion remarkably lowers a signal receiving level and causes a harmful effect on the system. To solve this problem, an inverse dispersion is added to the received optical signal, so that the chromatic dispersion be equivalently zero (or be cancelled). A conventional and typical method for this dispersion compensation is to provide a DCF (Dispersion Compensation Fiber) in each of repeater sections and to suppress variations in chromatic dispersion.

FIG. 12 shows a diagram conceptually explaining the WDM system that makes dispersion compensation by using the DCF. Nodes 50 and 60 are connected to each other through an optical fiber f1. The node 50 includes a post-emplifier 51 and the node 60 includes a pre-amplifier 61 and a DCF 62. The post-amplifier is an optical signal transmission amplifier to amplify a WDM signal obtained after processing in a node. The pre-amplifier is an optical signal receiving amplifier to receive a WDM signal transmitted from a preceding-stage node.

The WDM signal processed in the node 50 is amplified by the post-amplifier 51 and is then transmitted to the optical fiber f1. The WDM signal flown through the optical fiber f1, when reaching the node 60, passes through the DCF 62 and, after being amplified by the pre-amplifier 61, is processed in the node 60.

Thus, the chromatic dispersion of the WDM signal that produced a chromatic dispersion value (+D) by being flown through the optical fiber f1 is cancelled by passing through the DCF 62 having a chromatic dispersion value (−D). However, in the dispersion compensation using the above DCF, since the repeater sections of the node are variable (in land optical communication network in particular), there are variations in the chromatic dispersion values occurring in each of the repeater sections, it is necessary that the DCF that can correspond to the chromatic dispersion value is placed in each of the repeater sections.

Moreover, the chromatic dispersion value, due to its dependency on temperatures, varies depending on changes in temperature between day and night and among seasons and, in the WDM system handling a transmission speed of 40 Gbps, it is difficult to make dispersion compensation with high accuracy only using such a fixed dispersion value as the DCF.

On the other hand, a variable dispersion compensator called a VIPA (Virtually Imaged Phasesd Array) has been developed recently. The VIPA is an optical device having a chromatic dispersion element (VIPA plate) obtained by coating both sides of a thin plate such as a glass plate with a reflection film and a reflection mirror, which enables dispersion compensation of all wavelength bands of a WDM signal.

FIG. 13 shows a diagram conceptionally explaining the WDM system to make dispersion compensation using the VIPA. The nodes 50 and 70 are connected to each other through the optical fiber f2. The node 70 includes a pre-amplifier 71 and a VIPA 72. In such a system, a WDM signal flown from the node 50 undergoes dispersion compensation in every wavelength by the VIPA 72. The VIPA 72 has a feature that an amount of dispersion compensation can be set optimally in a manner to follow secular changes such as temperature variations in an optical fiber.

Thus, unlike the DCF which makes fixed dispersion compensation, the VIPA can achieve, in a variable manner, collective dispersion compensation over all wavelengths of a WDM signal and, therefore, construction of a WDM system based on automatic dispersion compensation technology using the VIPA is greatly expected.

Dispersion compensation technology, using a VIPA, for chromatic dispersion occurring when signals propagate through an optical fiber is disclosed in, for example, Japanese Patent Application Laid-open No. 2000-511655 (Pages 29 to 32, FIG. 14). In a WDM system, it is necesary that a gain of a pre-amplifier is set in an initial stage of operations of the WDM system and, in this case, some input light having a light level required for the gain setting is fed to the pre-amplifier. In ordinary cases, a gain is set by inputting an ASE (Amplified Spontaneous Emission) light, which is output from a post-amplifier being placed in a preceding-stage node, having a light level being equivalent to one wave of a WDM signal. Here, the optical amplifier including the post-amplifier and pre-amplifier as described above is generally made up of an EDFA (Erbium-dopped Fiber Amplifier). The EDFA is an optical amplifier using an EDF [Eribium($Er^{3+}$)-dopped Fiber] as a medium for amplification in which an optical signal is made to travel by irradiating the EDF with pumping light and, by using simulated emission occurring at the time of the irradiation, a level of an optical signal is amplified.

In the optical amplifier such as an EDFA using simulated emission as operational principles of amplification, irrespective of existence of light input to the optical amplifier, a phenomenon of spontaneous emission occurs. The light having leaked from the optical amplifier by the phenomenon becomes noise light which is the ASE light.

Moreover, a light level of the ASE light can be adjusted by a user. Therefore, by adjusting a post-amplifier in advance so as to have an optical level being equivalent to one wave of a WDM signal, ASE light at a desired level required for booting the pre-amplifier is emitted spontaneously from the post-amplfier at the time of an initial operation of the WDM system.

FIG. 14 shows a diagram showing a light level of one wave of a WDM signal and an ASE light level. In FIG. 14, a light level is plotted as ordinate and a wavelength as abscissa. The ASE light 82 has a light level being equivalent to one wave of a WDM signal by a bandwidth of all wavelengths of the WDM signal (the ASE light 82 and WDM signal 81 of one wave are the same in areas). The pre-amplifier receives the ASE light 82 as described above to automatically set a gain.

In the WDM system using the DCF as shown in FIG. 12, even if the ASE light 82 passes through the DCF 62, no change occurs in the level of the ASE light 82 and it is possible to normally do the gain setting of the pre-amplifier 61. However, the WDM system using the variable dispersion compensator such a VIPA 72 as shown in FIG. 13 has a problem in that, when the ASE light 82 is input to the VIPA 72 being placed in the preceding-stage of the pre-amplifier 71, a light level of the ASE light 82 is lowered to become a level value being different from a light level being equivalent to one wave of the WDM signal and normal setting of a gain of the pre-amplifier 71 cannot be done.

FIG. 15 shows a diagram conceptually explaining a level of the ASE light obtained after having passed through the VIPA. A light level is plotted as ordinate and a wavelength as abscissa. When a waveform of the ASE light 82 input to the VIPA 72 and obtained after having output from the VIPA 72 is observed, the ASE light 83 having a comb-shaped waveform as shown in FIG. 15 is seen. The level of the ASE light 83 is lowered when compared with the light level of the ASE light 82 as shown in FIG. 15 (an area of the ASE light 83 is smaller by an area being cut). The conventional WDM system has a problem in that, when such ASE light 83 is input to a pre-amplifier which requires a light level being equivalent to one wave of a WDM signal, an accurate setting of a gain is impossible, causing quality of the WDM system to be degraded.

Moreover, as an example of a device which causes a level of the ASE light to change when the ASE light is made to pass through the device, the VIPA is shown in the above embodiment, however, such a device is not limited to the VIPA. When the ASE light is made to pass through a device whose filtering function has wavelength periodicity, a level of the ASE light changes as shown in FIG. 15. (a phenomenon in which wavelength periodicity appears when light having a wide band (white light) is incident, light is output in a transmission manner in the order of $\lambda 1$, $\lambda 2$, $\lambda 3$ . . . is called "wavelength periodicity" and optical devices such as a VIPA, etalon, or the like provide a filtering function having the wavelength periodicity as described above).

SUMMARY OF THE INVENTION

In view of the foregoing, it is an object of the present invention to provide a light transmission system which is capable of booting a system using ASE light at an excellent quality level without having a harmful effect on gain setting of a pre-amplifier.

To accomplish the above object, according to the present invention, there is provided an optical transmission system for making transmission of an optical signal, including:

a first node having a post-amplifier to output noise light to an optical fiber in an amplifier booting mode and to amplify an optical signal and to output the amplified optical signal to an optical fiber in a working mode and an operational state informing unit to inform an operational state of the post-amplifier by using a monitoring control signal; and a second node having a pre-amplifier to receive the noise light and to do gain setting in an amplifier booting mode and to receive the optical signal and to amplify the received optical signal in a working mode, a variable dispersion compensator placed in a preceding-stage of the pre-amplifier to make, in a variable manner, compensation of dispersion of a wavelength caused by propagation of the optical signal through an optical fiber, a switching unit to select, when the noise light passes through the variable dispersion compensator, if a level of the noise light is deviated from a desired level, a bypass route so as to make the noise light not be input to the variable dispersion compensator but be input to the amplifier according to a switching instruction, in an amplifier booting mode, and to select a passage route so as to make the optical signal, after having been input to the variable dispersion compensator and having undergone dispersion compensation, be input to the pre-amplifier in a working mode, and a switch controller to output, when an amplifier booting mode is recognized by the monitoring control signal, the switching instruction signal to select the bypass route and to output the switching instruction signal for selection of the passage route in a working mode.

The above and other objects, features and advantages of the present invention will become apparent from the following description when taken in conjunction with the accompanying drawings which illustrate preferred embodiments of the present invention by way of an example.

BRIEF DESCRIPTION OF THE DRAWINGS

FIG. 10 shows contents of a parameter.

FIG. 14 shows a diagram showing a light level of one wave of a WDM signal and an ASE light level.

FIG. 15 shows a diagram conceptually explaining a level of an ASE light obtained after having passed through a VIPA.

DESCRIPTION OF THE PREFERRED EMBODIMENTS

Hereinafter, embodiments of the present invention are described by referring to drawings.

Figure 1:
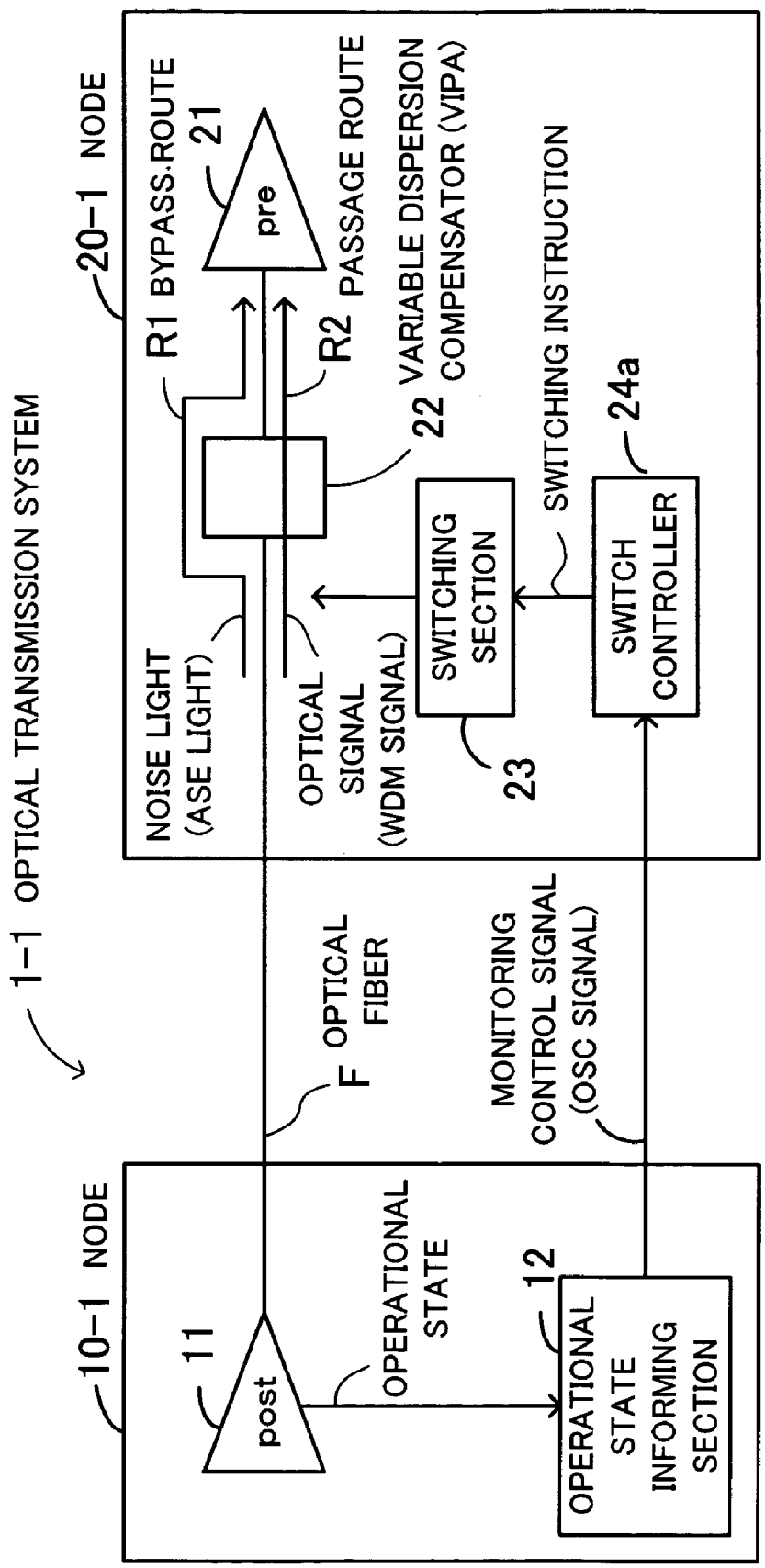
FIG. 1 shows operational principles of an optical transmission system of a first embodiment of the present invention.

FIG. 1 shows operational principles of an optical transmission system of a first embodiment of the present invention. The optical transmission system 1-1 of the first embodiment is a system in which a first node 10-1 is connected to a second node 20-1 through an optical fiber F and which makes WDM optical transmission. The node 10-1 is made up of a post-amplifier 11 and an operational state informing section 12. The post-amplifier 11 outputs noise light (hereinafter called "ASE light") to the optical fiber F in an amplifier booting mode (a booting mode of the pre-amplifier 21) and amplifies an optical signal (hereinafter called a "WDM signal") processed in the node 10-1 and outputs the signal to the optical fiber F in a working mode. The operational state informing section 12 informs an operational state of the post-amplifier 11 using a monitoring control signal. More particularly, the monitoring control signal denotes an OSC (Optical Supervisory Channel) signal. The OSC signal is an optical control signal which is used to do setting for operations, to monitor operational states, to detect a failure in a transmission path, or the like, and which is transmitted without being made to pass through the optical amplifier. Hereinafter, the monitoring control signal is called an "OSC signal".

The node 20-1 is made up of a pre-amplifier 21, a variable dispersion compensator 22, a switching section 23, and a switch controller 24a. The pre-amplifier 21 receives ASE light to do setting of a gain in an amplifier booting mode and receives a WDM signal to amplify the received signal and outputs the amplified signal to a processing section (not shown) in the node 20-1 in a working mode.

Figure 13:
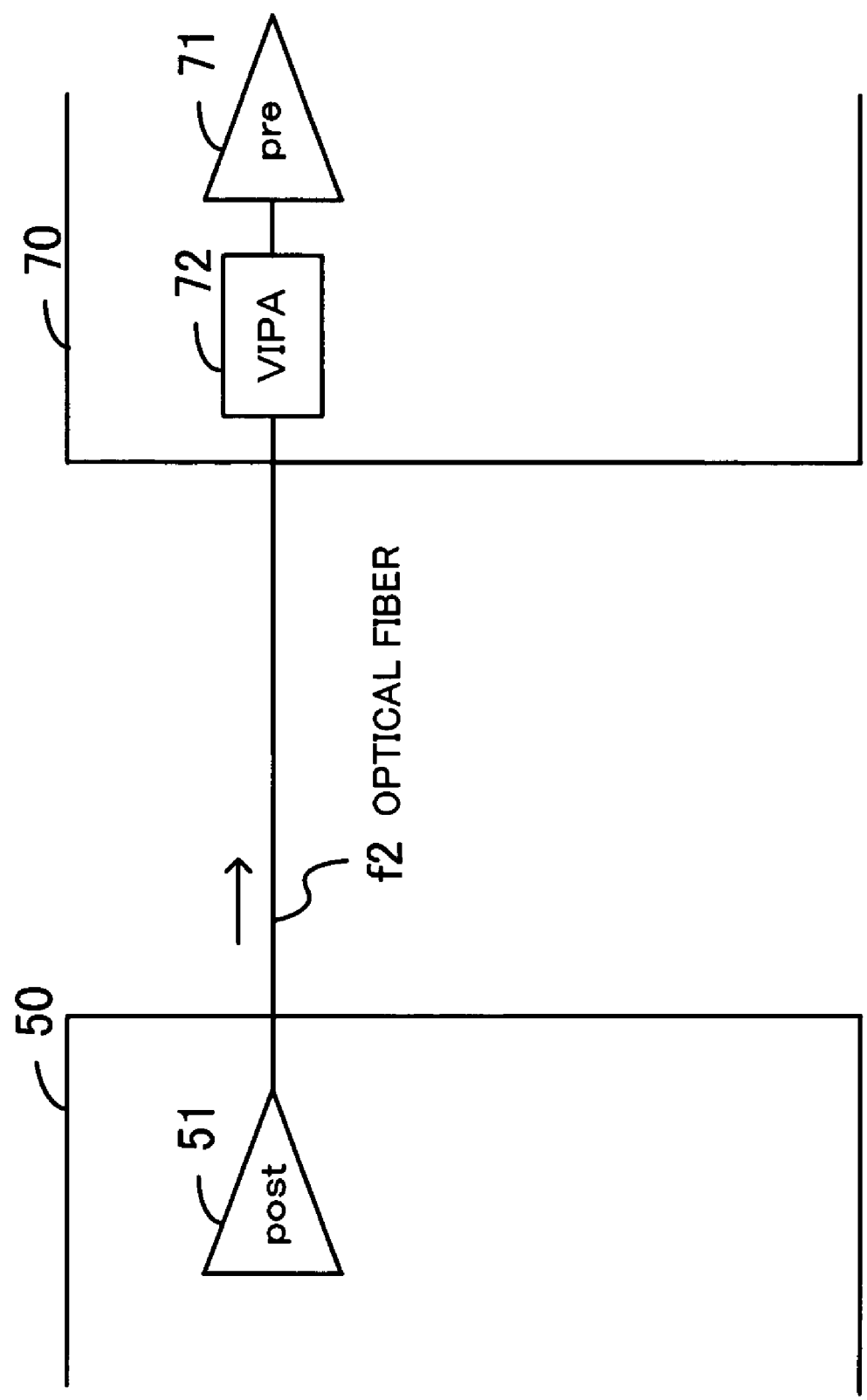
FIG. 13 shows a diagram conceptionally describing a WDM system to make dispersion compensation by using a VIPA.

The variable dispersion compensator 22 is mounted in a preceding-stage of the pre-amplifier 21 and makes dispersion compensation, in a variable manner, for chromatic dispersion occurring when a WDM signal propagates through the optical fiber F. The variable dispersin compensator 22 uses the VIPA described in FIG. 13 and, therefore, is called a "VIPA 22" hereinafter.

The switching section 23, if a level of ASE light is deviated from a desired level required for booting the pre-amplifier 21 when the ASE light passes through the VIPA 22 (when a change occurs from the ASE light 82 to the ASE 83 in FIG. 15), according to a switching instruction, performs switching so as to select a bypass route R1 by which the ASE light is not input to the VIPA 22 but is input to the pre-amplifier 21 in an amplifier booting mode. Also, in a working mode, a switching is performed so as to select a passage route R2 by which a WDM signal, after having been input to the VIPA 22 and undergone dispersion compensation, is input to the pre-amplifier 21.

The switch controller 24a, when recognizing the amplifier booting mode by the OSC signal, outputs an instruction for switching to select the bypass route R1. Also, in a working mode, a switching instruction is output to select the passage route R2.

Now, characteristics of amplification of a WDM signal employed in the first embodiment are described. In the amplification, an ALC (Automatic Level Control) mode and AGC (Automatic Gain Control) mode are used. The ALC mode is used to keep constant a level of an output from an optical amplifier even when an input changes. More particularly, a gain (ratio of an optical input level to an optical output level) of an optical amplifier is set, without using a level of optical input to an optical amplifier, so that an output "Pt" from the optical amplifier is made constant (=Pn×n), where "n" denotes the number of multiplexed wavelengths and "Pn" denotes a targeted output level for one wave.

The AGC mode is used to keep a gain of an optical amplifier constant. Therefore, in the AGC mode, control is exercised so that a gain of an optical amplifier is constant when an input level of the optical amplifier changes and, as a result, its output level changes in a manner to follow the input level. In the WDM transmission method, by employing the ALC mode and AGC mode in combination, smooth optical amplification control is exerted.

In ordinary cases, the pre-amplifier 21 has both the functions of the ALC and AGC mode operations and the post-amplifier 11 has only the function of the AGC mode operations. In the pre-amplifier 21, at time of initial setting for booting the WDM system 1-1 or the amplifier 21, the ALC mode starts in which a gain is set and, after that, its operation mode moves to the AGC mode (that is; the mode changes to be the AGC mode after the gain setting) and is put in a working state. The post-amplifier 11 outputs ASE light at time of initial setting (in the amplifier booting mode) and is put into its AGC mode at time of operations (gain of the post-amplifier 11 has been set in advance).

Figure 2:
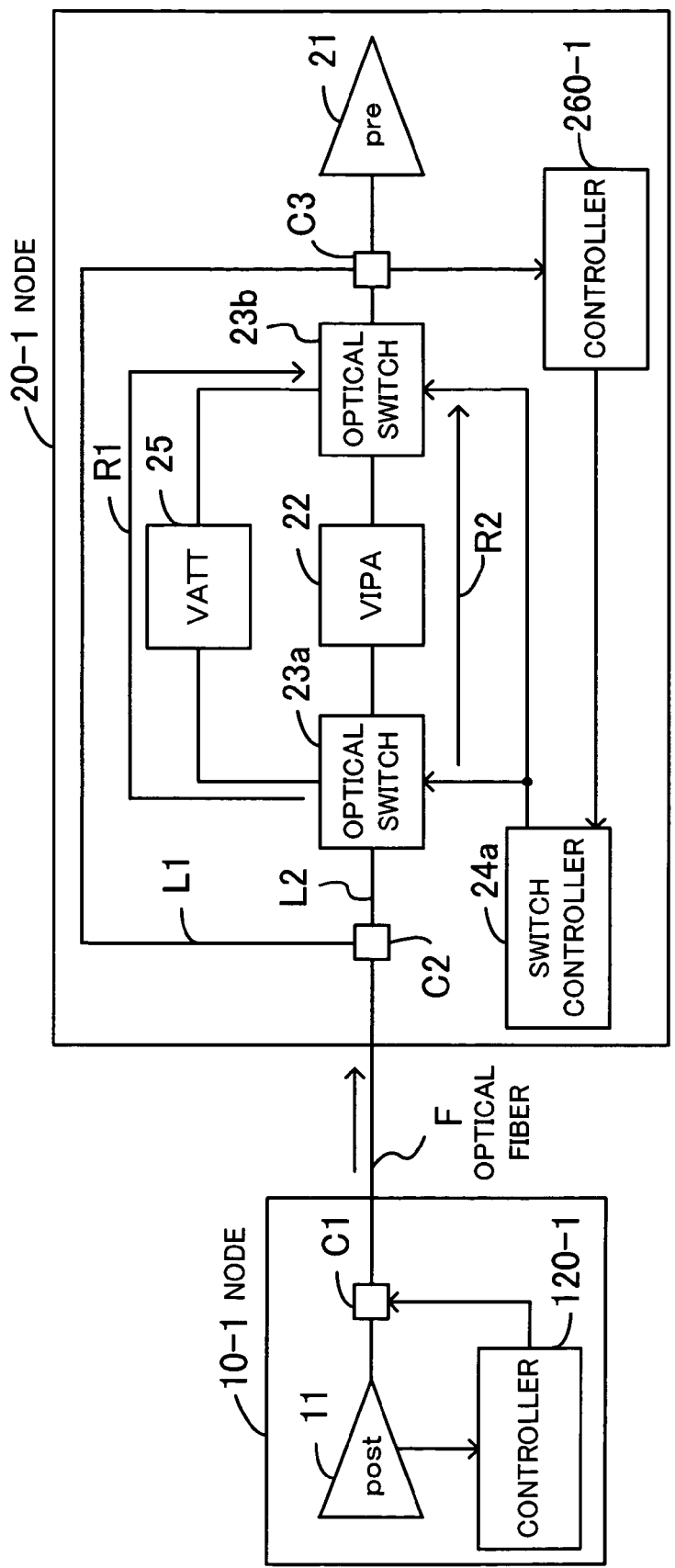
FIG. 2 shows composing elements related to switching operations.
Figure 3:
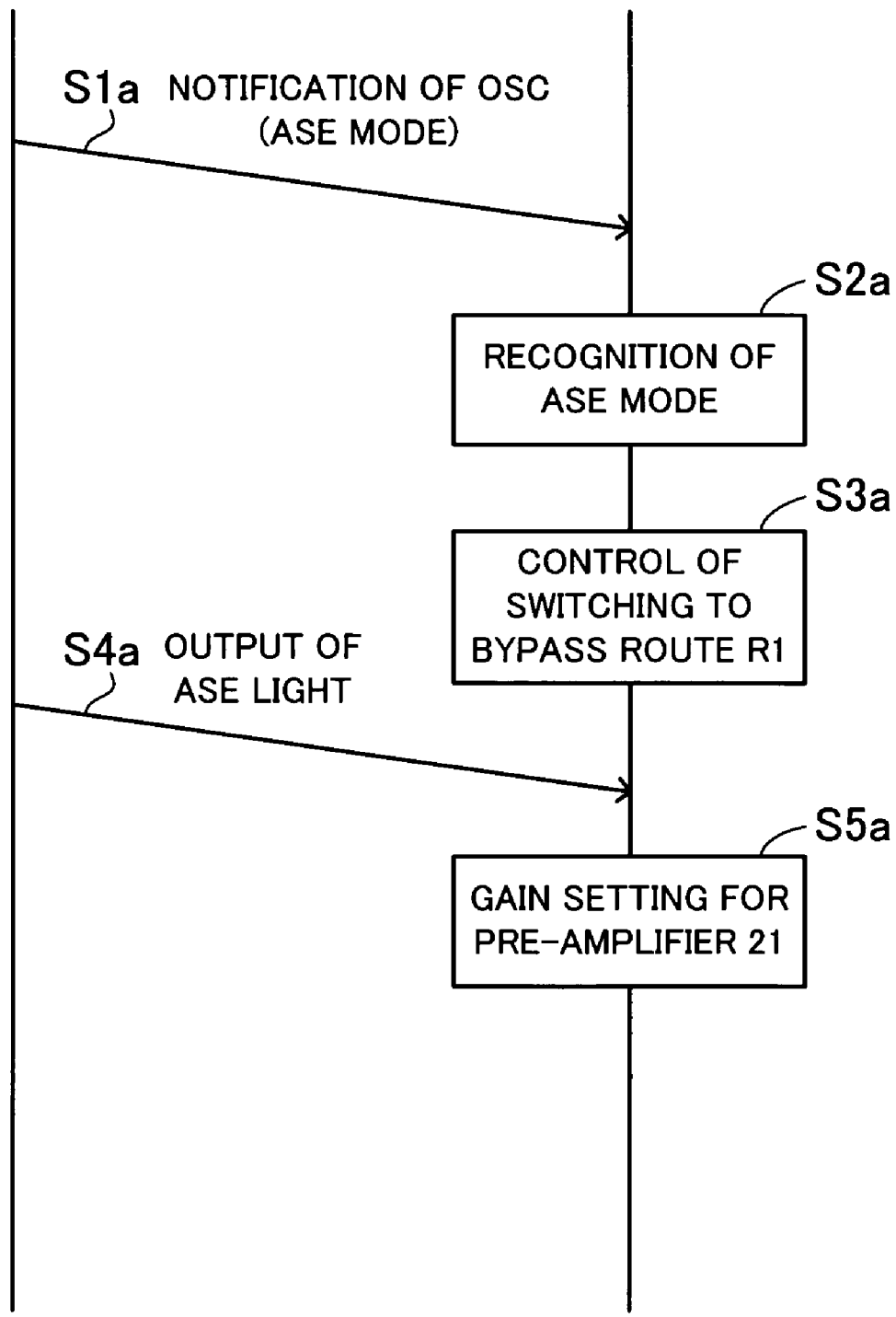
FIG. 3 shows an operational sequence occuring in an amplifier booting mode.
Figure 4:
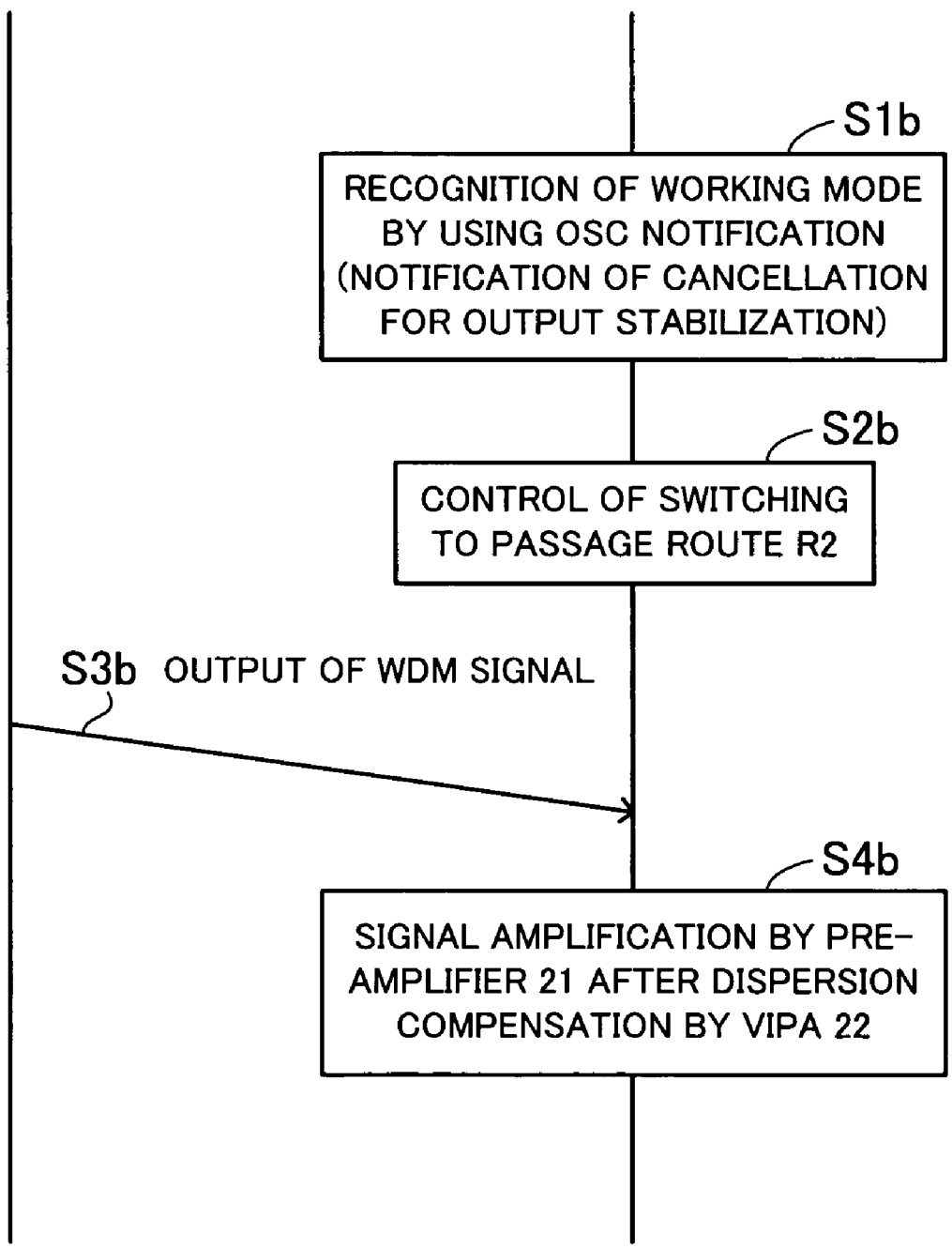
FIG. 4 shows an operational sequence occuring in a working mode.

Next, components related to the switching control and switching operations in the amplifier booting mode and in the working mode are described by referring to FIG. 2 to FIG. 4. Hereinafter, the amplifier booting mode is called an "ASE mode".

FIG. 2 is a diagram showing composing elements related to switching operations. The node 10-1 includes a post-amplifier 11, a controller 120-1 (including the operational state informing section 12), and a coupler C1. The node 20-1 includes a pre-amplifier 21, a VIPA 22, optical switches 23a and 23b (being equivalent to the switching section 23 in FIG. 1), a switch controller 24a, a VATT (Variale Optical Attenuator) 25, a controller 260-1, a coupler C2 and a coupler C3. The coupler C1 multiplexes optically a signal output from the post-amplifier 11 and an OSC signal output from the controler 120-1 and outputs the mutiplexed signal to the optical fiber F. The coupler C2 makes the OSC signal flow through a line L1 and signals other than the OSC signal flow through a line L2 in a divided manner. The coupler C3 makes the OSC signal flown through the line L1 flow into the controller 260-1 and a signal output from the optical switch 23b flow into the pre-amplifier 21 in a divided manner. (The couplers C2 and C3 are constructed so as to receive the OSC signal output from the node 10-1 all the time, regardless of switching operations of the optical switches 23a and 23b).

The VATT 25 is inserted on the bypass route R1. The reason for the insertion of the VATT 25 is that, only one wave of an optical signal may be transmitted, as a WDM signal, with a plurality of wavelengths not multiplexed, from the node 10-1 and, in that case, the pre-amplifier 21 originally recognizes the optical level obtained then as a level required for gain setting; however, actually by assuming a level of an ASE light over all bands of the WDM signal to be a level of an optical signal being equivalent to one wave of a quasi WDM signal, the WDM system is booted at the time of initial setting before a WDM signal is output. On the other hand, the VIPA 22 has an individual difference in amounts of optical loss depending on a device and a difference in amounts of optical loss depending on its transmission wavelength and, therefore, amounts of optical loss occurring when an optical signal of one wave passes through the VIPA 22 vary in each of the VIPA 22 to be used. As a result, even in the pre-amplifier 21, a difference occurs in a level being equivalent to one wave required for the gain setting.

Therefore, by mounting the VATT 25 on the bypass route R1 through which the ASE light flows and by presetting amounts of optical loss that would occur in the VIPA 22 to be used therein, it is possible to accommodate variations in amounts of optical loss occurring in the VIPA 22 and possible to make a receiving level of the pre-amplifier 21 obtained when an optical signal of one wave flows through the passage route R2 be equal to a receiving level of the pre-amplifier 21 obtained when an ASE light flows through the bypass route R1.

FIG. 3 shows an operatonal sequence explaining operations in an ASE mode.

Step S1a: The controller 120-1 of the node 10-1, when recognizing an ASE mode based on an operational state of the post-amplifier 11, generates an OSC signal indicating the recognition and outputs the signal through the coupler C1.

Step S2a: The OSC signal having reached the node 20-1 is made by the coupler C2 to flow to the line L1 and is then made by the coupler C3 to be transmitted to the controller 260-1. The controller 260-1 informs the switch controller 24a of the contents of the OSC signal.

Step S3a: The switch controller 24a, when recognizing that operations are in the ASE mode, outputs a switching instruction signal for selection of the bypass route R1 to the optical switches 23a and 23b.

Step S4a: An ASE light having a level being equivalent to one wave of a WDM signal is output from the post-amplifier 11.

Step S5a: The ASE light having reached the node 20-1 passes through the optical switch 23a, then the VATT 25, and the bypass rotue R1 of the optical switch 23b and is made by the coupler C3 to be input to the pre-amplifier 21. In the pre-amplifier 21, a gain is set by using the ASE light.

FIG. 4 shows an operational sequence in a working mode.

Step S1b: The switch controller 24a recognizes a working mode of the pre-amplifier 21 (more specifically, as described later by referring to the FIG. 8, the working mode is recognized using a notification of output stabilization cancelling of ASE light.

Step S2b: The switch controller 24a outputs a signal of an instruction for switching to select the passage route R2 to the optical switches 23a and 23b.

Step S3b: A WDM signal is output from the post-amplifier 11.

Step S4b: The WDM signal having reached the node 20-1 passes through the optical switch 23a, then VIPA 22, and the passage route R2 of the optical switch 23b and is made by the coupler C3 to be input to the pre-amplifier 21. Then, the pre-amplifier 21 amplifies the WDM signal having undergone the dispersion compensation made in the VIPA 22 and outputs the amplifier signal to the processing section of the node 20-1.

Figure 5:
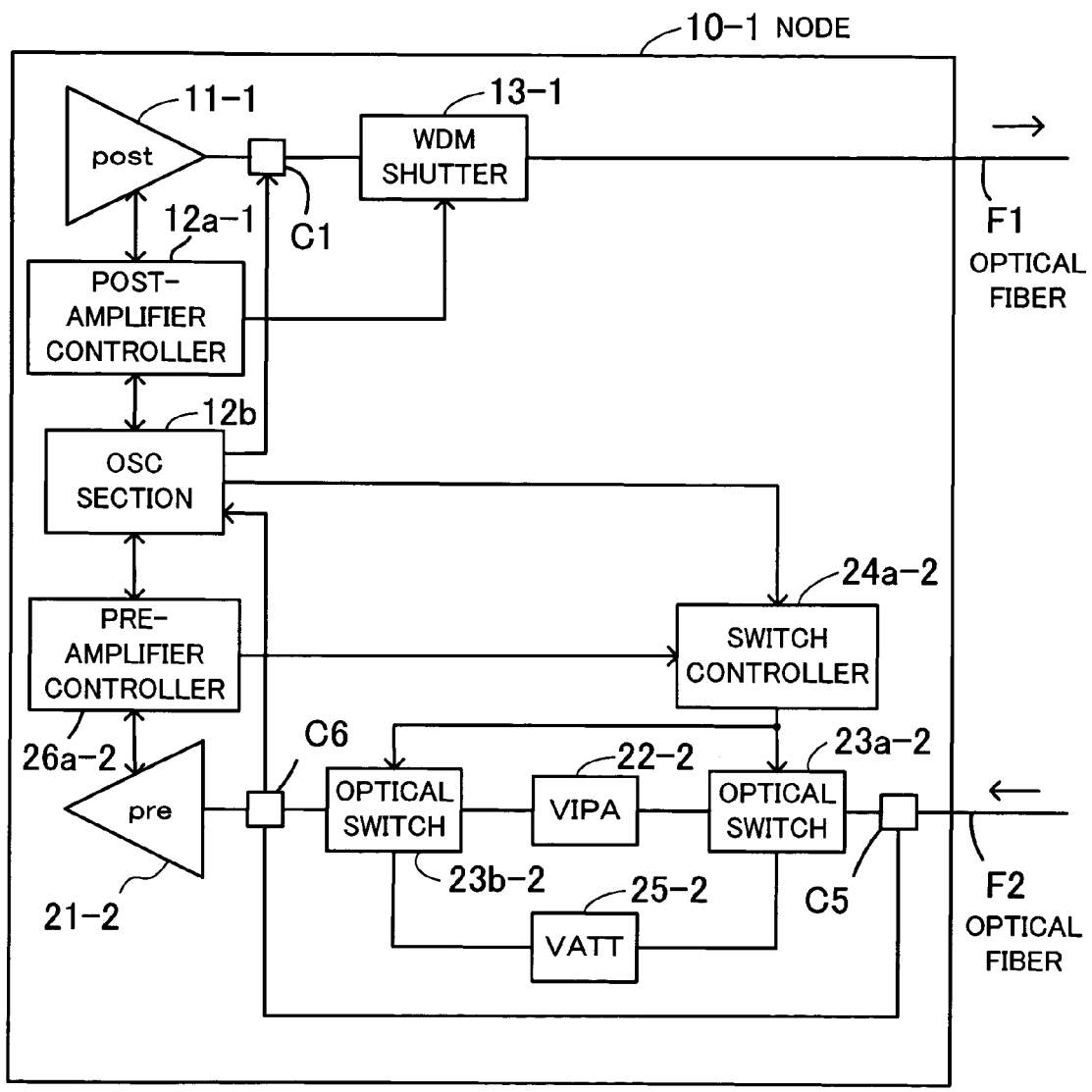
FIG. 5 shows configurations of the optical transmission system.
Figure 6:
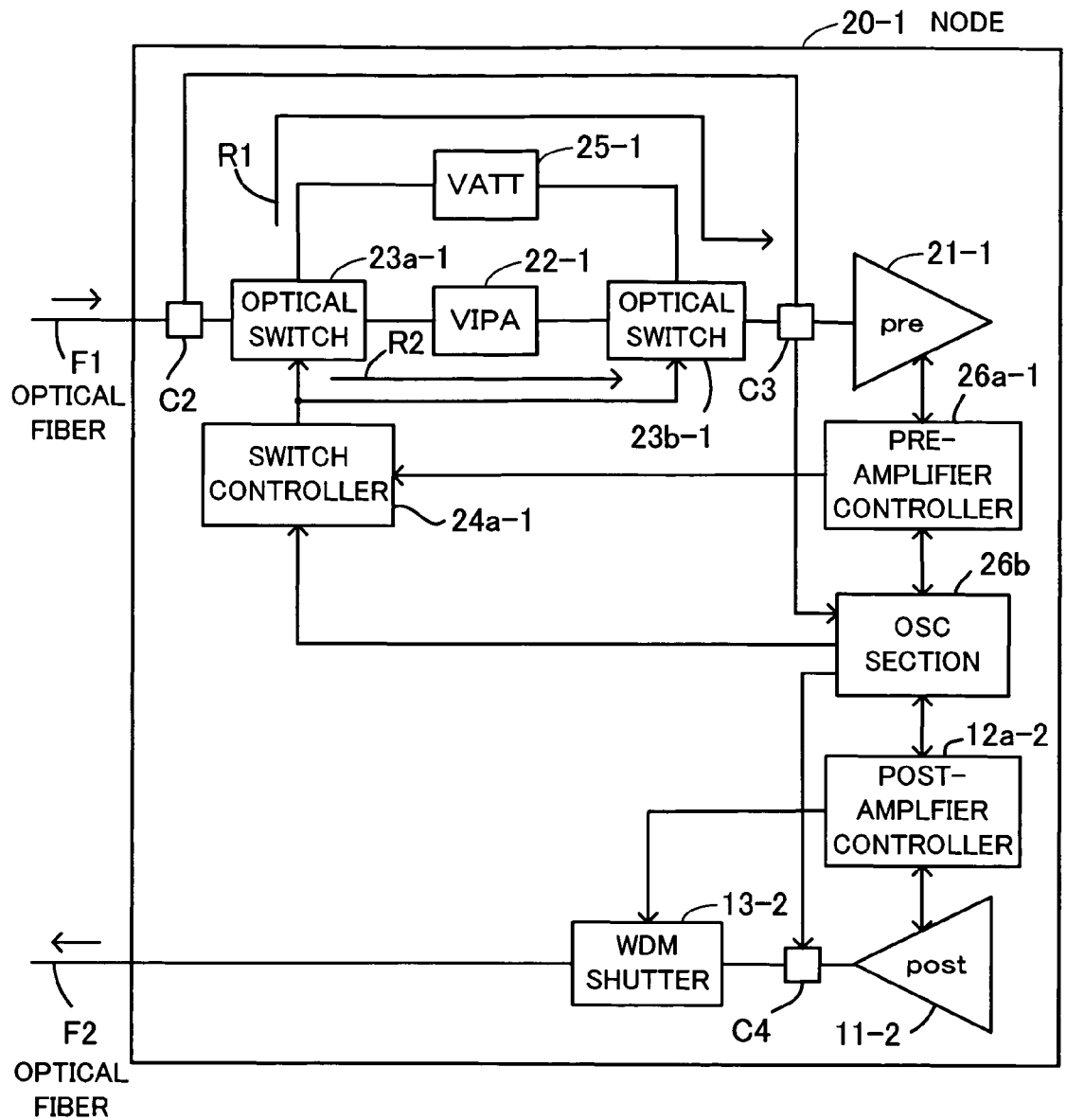
FIG. 6 also shows configurations of the optical transmission system.

Next, configurations and operations of the optical transmission system for the upward and downward transmission are described. FIGS. 5 and 6 show the configurations of the optical transmission system 1-1. Configurations of the upward and downward transmission nodes are explained collectively.

As shown in FIG. 5, composing elements related when optical transmission is made from the node 10-1 to the node 20-1 through the optical fiber F1 include a post-amplifier 11-1, a post-amplifier controller 12a-1, a coupler C1, and a WDM shutter 13-1. Also, composing elements related when optical transmission is made from the node 20-1 to the node 10-1 through the optical fiber F2 include a coupler 5, an optical switches 23a-2 and 23b-2, a VIPA 22-2, a VATT 25-2, a coupler C6, a switch controller 24a-2, a pre-amplifier 21-2, and a pre-amplifier controller 26a-2. The node 10-1 also includes an OSC section 12b which is a composing element to receive and transmit an OSC signal related to the transmission to be made by both the optical fibers F1 and F2 (the post-amplifier controller 12a-1 and the OSC section 12b are sections being equivalent to the controller 120-1 shown in FIG. 2).

As shown in FIG. 6, composing elements related when optical transmission is made from the node 10-1 to the node 20-1 through the optical fiber F1 include a coupler C2, optical switches 23a-1 and 23b-1, a VIPA 22-1, a VATT 25-1, a coupler C3, a switch controller 24a-1, a pre-amplifier 21-1, and a pre-amplifier controller 26a-1. Also, composing elements related when optical transmission is made from the node 20-1 to the node 10-1 through the optical fiber F2 include a post-amplifier 11-2, a post-amplifier controller 12a-2, a coupler C4, and a WDM shutter 13-2. The node 20-1 also includes an OSC section 26b which is an composing element to receive and transmit an OSC signal related to the transmission to be made by both the optical fibers F1 and F2 (the pre-amplifier controller 26a-1 and the OSC section 26b are sections being equivalent to the controller 260-1 shown in FIG. 2). Moreover, the above WDM shutters 13-1 and 13-2, when a WDM signal is output from the post-amplifiers 11-1 and 11-2, are put into an open state and, when an ASE light is output, are input into a closed state.

Figure 7:
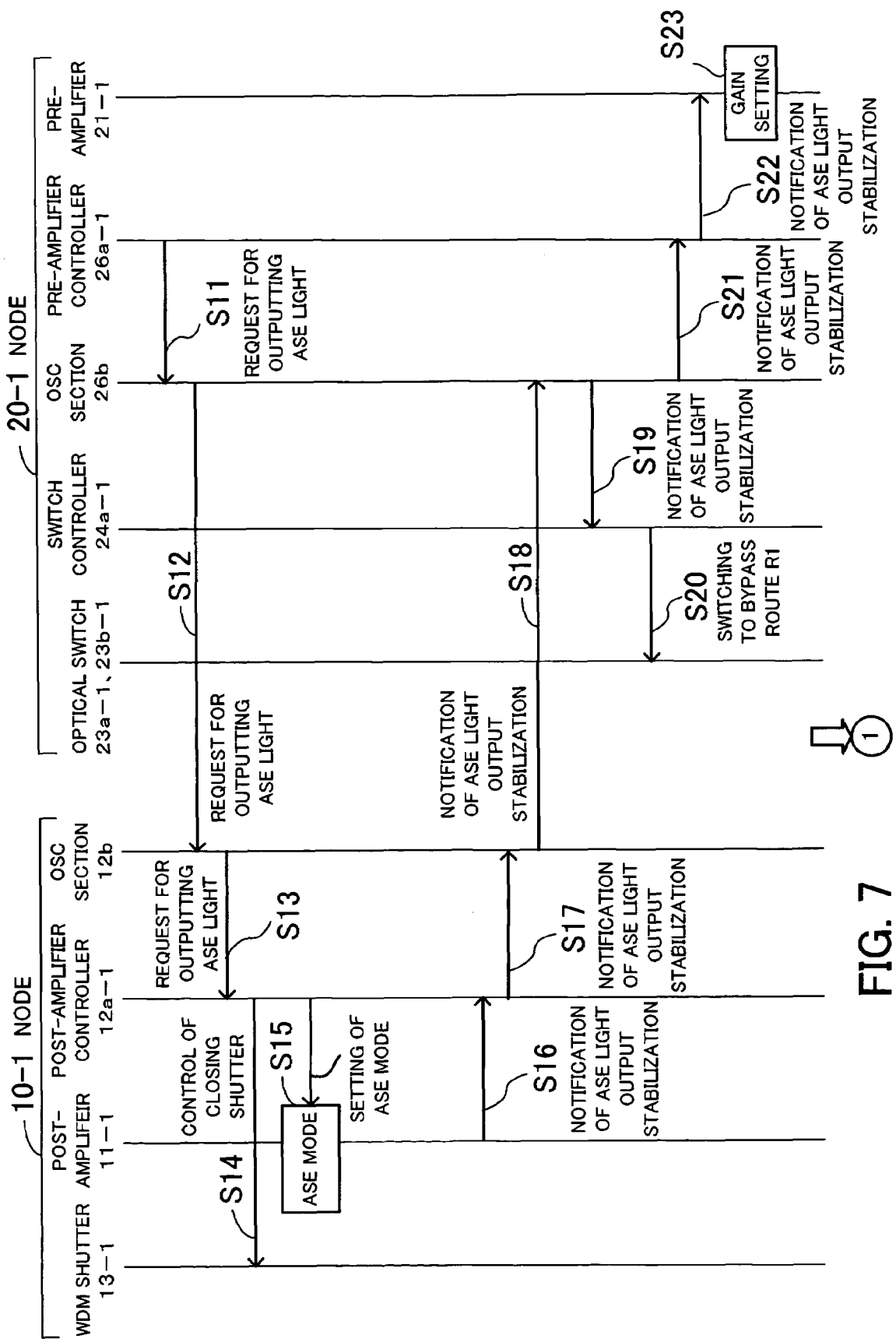
FIG. 7 shows an operational sequence explaining operations of the optical transmission system.
Figure 8:
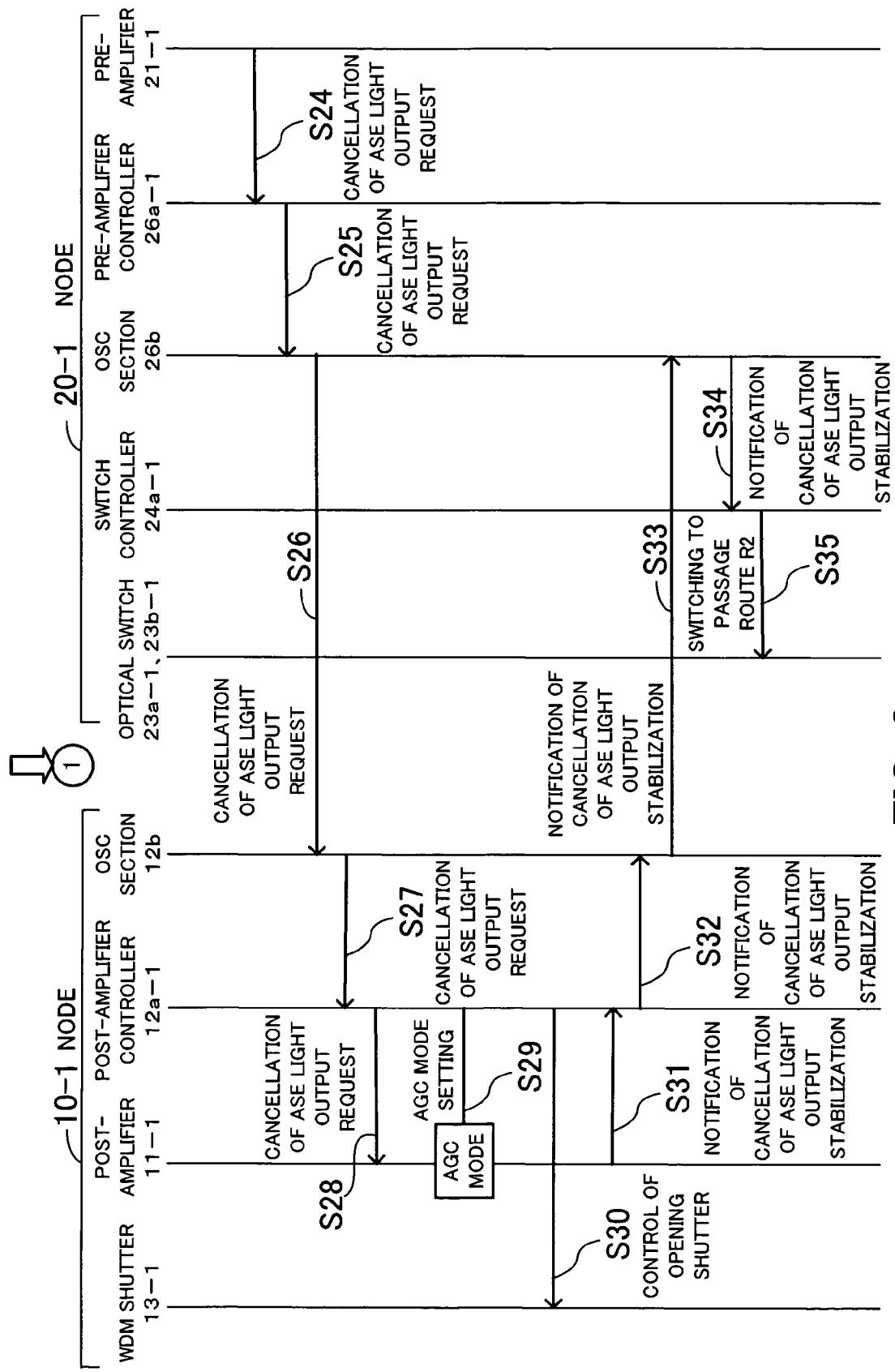
FIG. 8 also shows an operational sequence explaining operations of the optical transmission system.

Next, operations of the optical transmission system are described. Since operations for the upward and downward optical transmission are the same, only operations for optical transmission from the node 10-1 to the node 20-1 are explained. FIGS. 7 and 8 show operational sequences explaining operations of the optical transmission system 1-1.

Step S11: An ASE light output requesting signal is transmitted from the pre-amplifier controller 26a-1 in the node 20-1 to the OSC section 26b.

Step S12: An ASE light output requiring signal is transmitted from the OSC section 26b to the OSC section 12b in the node 10-1. The OSC signal containing a request for outputting the ASE light flows through the components in the order of the OSC section 26b, coupler C4, WDM shutter 13-2, optical fiber F2, coupler C5, coupler C6, and OSC section 12b.

Step S13: An ASE light output requesting signal is transmitted from the OSC section 12 to the post-amplifier controller 12a-1.

Step S14: The post-amplifier controller 12a-1 controls the WDM shutter 13-1 so as to close its shutter.

Step S15: The post-amplifier 12a-1 does setting required for the post-amplifier 11-1 to change its operational mode to the ASE mode and, as a result, the mode of the post-amplifier 11-1 is changed to the ASE mode.

Step S16: An ASE light output stabilization notifying signal is transmitted from the post-amplifier 11-1 to the post-amplifier controller 12a-1.

Step S17: The OSC section 12b outputs an ASE light output stabilization notifying signal is transmitted from the post-amplifier controller 12a-1 to the OSC section 12b.

Step S18: The OSC sectin 12b outputs an ASE light output stabilization notifying signal to the OSC section 26b in the node 20-1. The OSC signal containing a notification of the ASE light output stabilization is transmitted through the components in the order of the OSC section 12b, coupler C1, WDM shutter 13-1, optical fiber F1, coupler C2, coupler C3, and OSC section 26b.

Step S19: The OSC section 26b transmits a signal for notifying of the ASE light output stabilization to the switch controller 24a-1.

Step S20: A switching instruction making the optical switches 23a-1 and 23b-1 select the bypass route R1 is output from the switch controller 24a-1.

Step S21: The OSC section 26b transmits a signal for notifying of the ASE light output stablization to the pre-amplifier controller 26a-1.

Step S22: The pre-amplifier controller 26a-1 transmits a signal for notifying of the ASE light output stabilization to the pre-amplifier 21-1.

Step S23: The pre-amplifier 21-1 does gain setting by using the ASE light to be received.

Step S24: The pre-amplifier 21-1, after having done the gain setting, transmits a signal for notifying the cancellation of the ASE light output request to the pre-amplifer controller 26a-1.

Step S25: The pre-amplifier controller 26a-1 transmits a signal for notifying the cancellation of the ASE light output request to the OSC section 26b.

Step S26: The OSC section 26b transmits a signal for notifying the cancellation of the ASE light output request to the OSC section 12b in the node 10-1. The OSC signal representing the cancellation of the ASE light output request flows through the components in the order of the OSC section 26b, coupler C4, WDM shutter 13-2, optical fiber F2, coupler C5, coupler C6, and OSC section 12b.

Step S27: The OSC section 12b transmits a signal for notifying the cancellation of the ASE light output request to the post-amplifier controller 12a-1.

Step S28: The post-amplifier controller 12a-1 transmits a signal for notifying the cancellation of the ASE light output request to the post-amplifier 11-1 to stop outputting of the ASE light.

Step S29: The post-amplifier 12a-1 does setting required for the post-amplifier 11-1 to change its operational mode to the AGC mode and, as a result, the mode of the post-amplifier 11-1 is changed to the ASE mode.

Step S30: The post-amplifier controller 12a-1, after the operational mode of the post-amplifier 11-1 has been changed to the AGC mode, controls the WDM shutter 13-1 so as to open its shutter.

Step S31: The post-amplifier 11-1 transmits a signal for notifying the cancellation of the ASE light output stabilization to the post-amplifier controller 12a-1.

Step S32: The post-amplifier controller 12a-1 outputs a signal for notifying the cancellation of the ASE light output stabilization to the OSC section 12b.

Step S33: The OSC section 12b transmits a signal of notifying the cancellation of the ASE light output stabilization to the OSC section 26a in the node 20-1. The OSC signal representing the cancellation of the ASE light output stabilization flows through the components in the order of the OSC section 12b, coupler C1, WDM shutter 13-1, optical fiber F1, coupler C2, coupler C3 and OSC section 26b.

Step S34: The OSC section 26b transmits a signal for notifying the cancellation of the ASE light output stabilization to the switch controller 24a-1.

Step S35: The switch controller 24a-1 outputs a signal of a switching instruction for selection of the passage route R2 to the optical switches 23a-1 and 23b-1.

As described above, the optical transmission system 1-1 is so configured as to control the switching so that, in the ASE mode, the bypass route R1 is selected which makes the ASE light not be input to the VIPA 22 and, in the ordinary working mode, the passage route R2 is selected which makes a WDM signal be input to the VIPA 22 where dispersion compensation is made. By configuring as above, without causing a harmful effect to the gain setting of the pre-amplifier 21, the optical transmission system 1-1 can be booted by using the ASE light in a manner to provide high quality and, in the optical transmission system where the pre-amplifier 21 in the ASE mode is booted, highly accurate dispersion compensation using the VIPA 22 can be made.

Next, an optical transmission system of a second embodiment is described. According to the second embodiment, unlike in the case of the first embodiment where an operational mode is recognized from an OSC signal transmitted from the node 10-1 to perform the switching, the ASE mode or working mode is recognized by comparing a threshold value of an input light level within a self-node without using an external trigger fed from a facing node to perform the switching.

Figure 9:
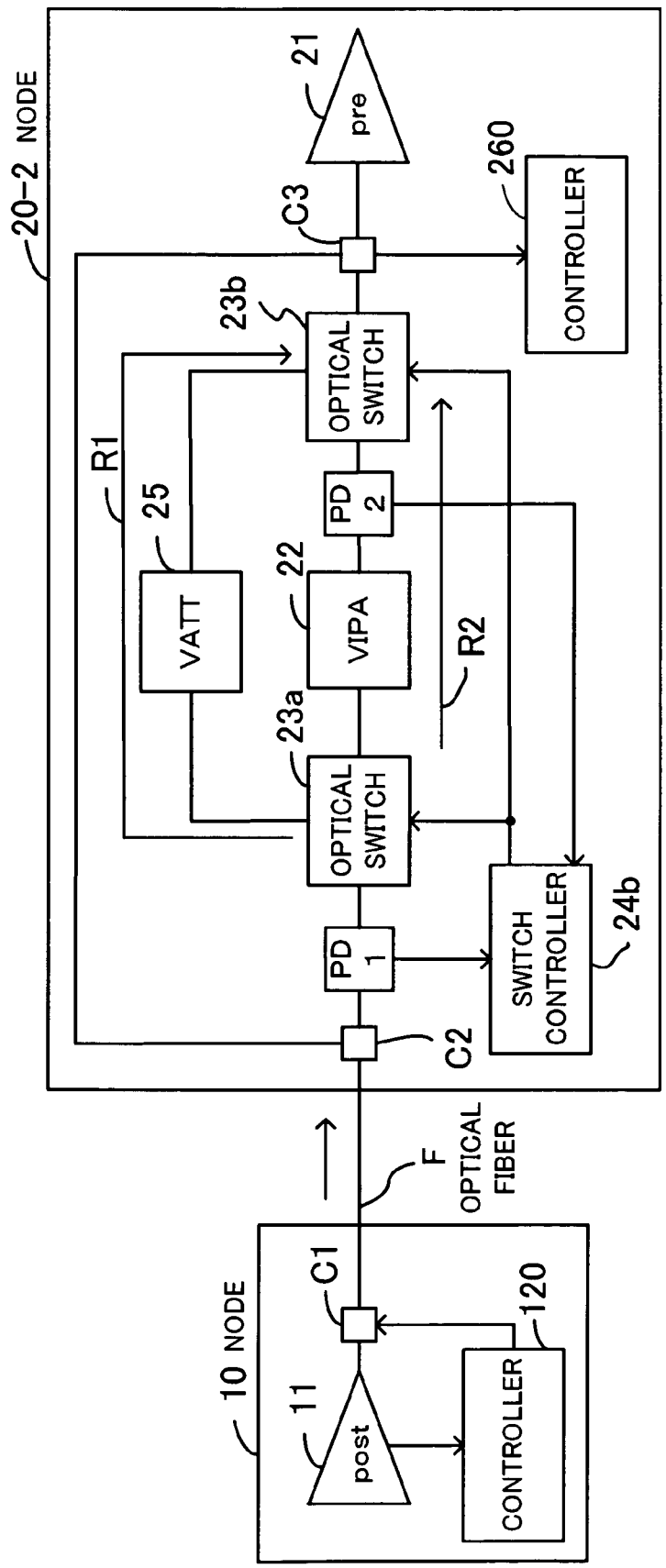
FIG. 9 shows composing elements related to switching operations.

FIG. 9 shows composing elements related to switching operations. The node 10 includes a post-amplifier 11, a controller 120, and a coupler C1. The node 20-2 includes a pre-amplifier 21, VIPA 22, optical switches 23a and 23b, a switch controller 24b, VATT 25, a controller 260, and optical level detector (hereinafter, PD (Photo Diode) 1 and PD2). The PD1 detects a light level on an input side of the VIPA 22 and the PD2 detects a light level on an output side of the VIPA 22 and results from the detection are transmitted to the switch controller 24b. The switch controller 24b, based on results from the detection of a light level, estimates a receiving level at the PD2 occurring when one wave of a WDM signal (hereinafter, called "single wave WDM signal") is input and a receiving level at the PD2 occurring when ASE light is input (in both the cases, receiving level occurring when the signals have passed through the VIPA 22) and calculates, in advance, a threshold value from the estimated values. Then, by comparing the threshold value with the receiving level at the PD2 occurring at time of operations of the system, the operating mode is judged.

Next, operations are described by using concrete values. First, the switch controller 24b judges, based on the receiving level, whether or not some light has reached the node 20-2. In this case, the following expression (1) is used.

$$PD1\ \text{in} < -40\ \text{dBm} \quad (1)$$

where "PD1 in" denotes a level of light (dBm) to be input to the PD1 (detection result of light level occurring on the input side). When the expression (1) holds, light is not input to the PD1 (called an "INDOWN" state) and, then, the post-amplifier 11 is put into the ASE mode, switching is done so that the light passes through the bypass route R1.

Next, a receiving level occurring when the single wave WDM signal and ASE light which have flown through the passage route R2 and reached the PD2 is estimated in advance.

The estimation equation (2) of a receiving level $L_{WDM}$ of the single wave WDM signal at the PD2 is as follows.

$$L_{WDM} = PD1\ \text{in}_{AGC} - PD1_{Loss} - (\text{Branch loss}) - (\text{Coupler loss}) - (VIPA\ \text{transmission wavelength loss}_{WDM}) - (VIPA\ \text{loss}) - X \quad (2)$$

The estimation equation (3) of a receiving level $L_{ASE}$ of the ASE light at the PD2 is as follows.

$$L_{ASE} = PD1\ \text{in}_{ASE} - PD1_{Loss} - (\text{Branch loss}) - (\text{Coupler loss}) - (VIPA\ \text{transmission wavelength loss}_{ASE}) - (VIPA\ \text{loss}) - X \quad (3)$$

FIG. 10 shows contents of parameters. In the expressions (2) and (3), "PD1 in$_{AGC}$" denotes a receiving level (dBm) at the PD1 occurring when single wave WDM signal is output and the "PD1 in$_{ASE}$" denotes a receiving level (dBm) at the PD1 occurring when the post-amplifier 11 outputs ASE light. Also, PD1$_{Loss}$ denotes an amount (dB) of light loss of the PD1, the branch loss denotes an amount (dB) of light loss to be divided by the coupler C2, the coupler loss denotes an amount (dB) of light loss that the coupler C2 has. The VIPA transmission wavelength loss$_{WDM}$ denotes an amount (dB) of light loss which varies depending on a transmission wavelength of single wave WDM signal of the VIPA 22. The VIPA transmission wavelength loss$_{ASE}$ denotes an amount (dB) of light loss which varies depending on a transmission wavelength of ASE light of the VIPA 22. The VIPA loss denotes an amount (dB) of light loss that the VIPA 22 has. Moreover, "PD1 in $_{AGC}$" and "PD1 in $_{ASE}$" take substantially the same value.

Moreover, the parameter X is provided to finely adjust a threshold value since various devices each have an individual difference in amounts of optical loss. For the convenience of the description, it is assumed that every device is in an ideal state in which there is no light loss caused by an individual difference and, therefore, the parameter X is set at "0".

Here, if a value of each parameter is assumed to be as shown in FIG. 10, the equation (2) obtained when the post-amplifier 11 outputs single wave WDM signal is given as follows:

$$L_{WDM}=1-0.5-3-0.5-1-0.5=-4.5 \text{ dBm}.$$

Also, the equation (3) obtained when the post-amplifier 11 outputs ASE light is given as follows:

$$L_{ASE}=1-0.5-3-0.5-5-0.5=-8.5 \text{ dBm}.$$

Therefore, by selecting an intermediate value between −4.5 dBm and −8.5 dBm, the threshold value is set at −6.5 dBm in advance.

In the switch controller 24b, if the equation (1) does not hold (passage route R2 is selected by the switching) and a receiving level of the PD2 is less than a threshold value (−6.5 dBm), the post-amplifier 11 is assumed to transmit ASE light and switching to the bypass route R1 is done. Also, if the equation (1) does not hold and a receiving level of the PD2 exceeds the threshold value (−6.5 dBm), the post-amplifier 11 is assumed to transmit single wave WDM signal and switching to the passage route R2 is done.

Next, an optical transmission system of a third embodiment is described. In the third embodiment, instead of detecting a receiving level of an input light, an optical spectrum of an input light is measured without using an external trigger, ASE mode/working mode are recognized and switching is done.

Figure 11:
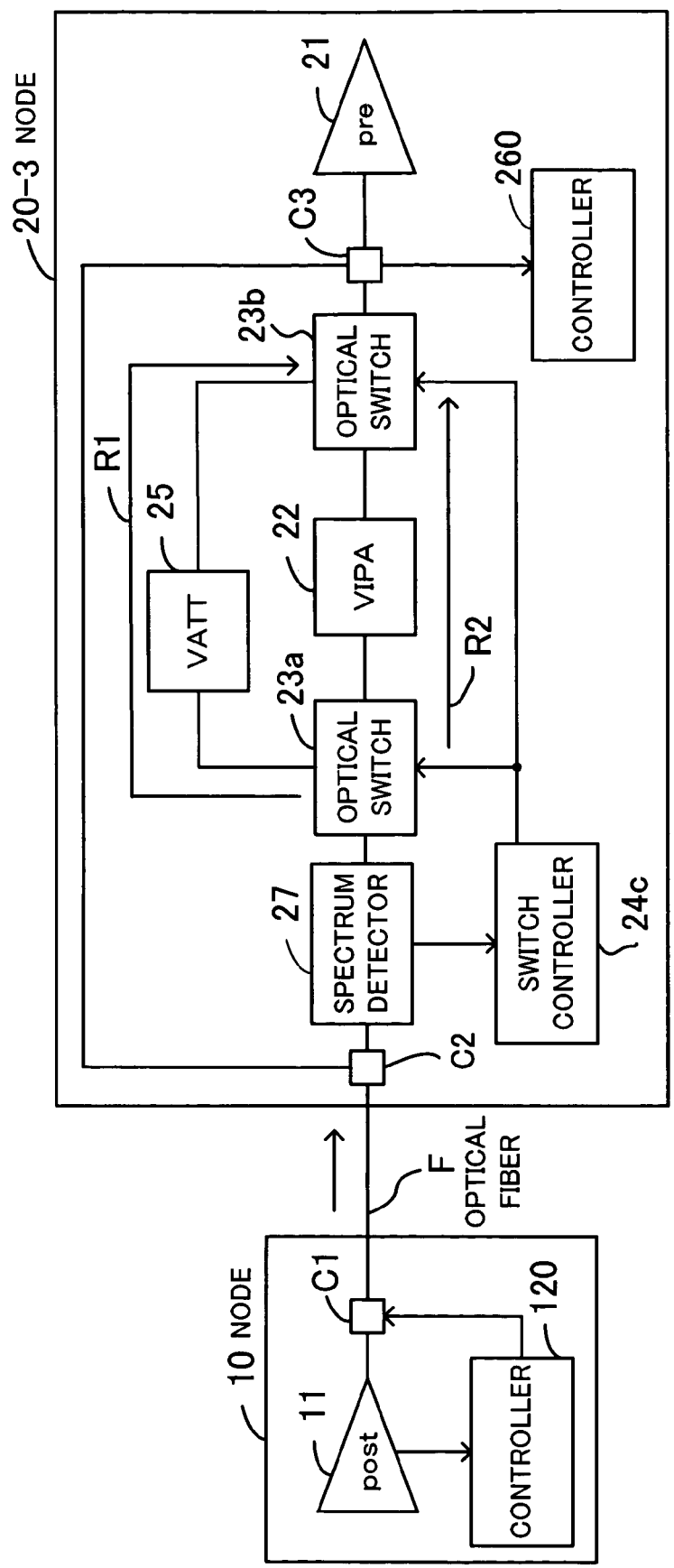
FIG. 11 shows composing elements related to switching operations.
Figure 12:
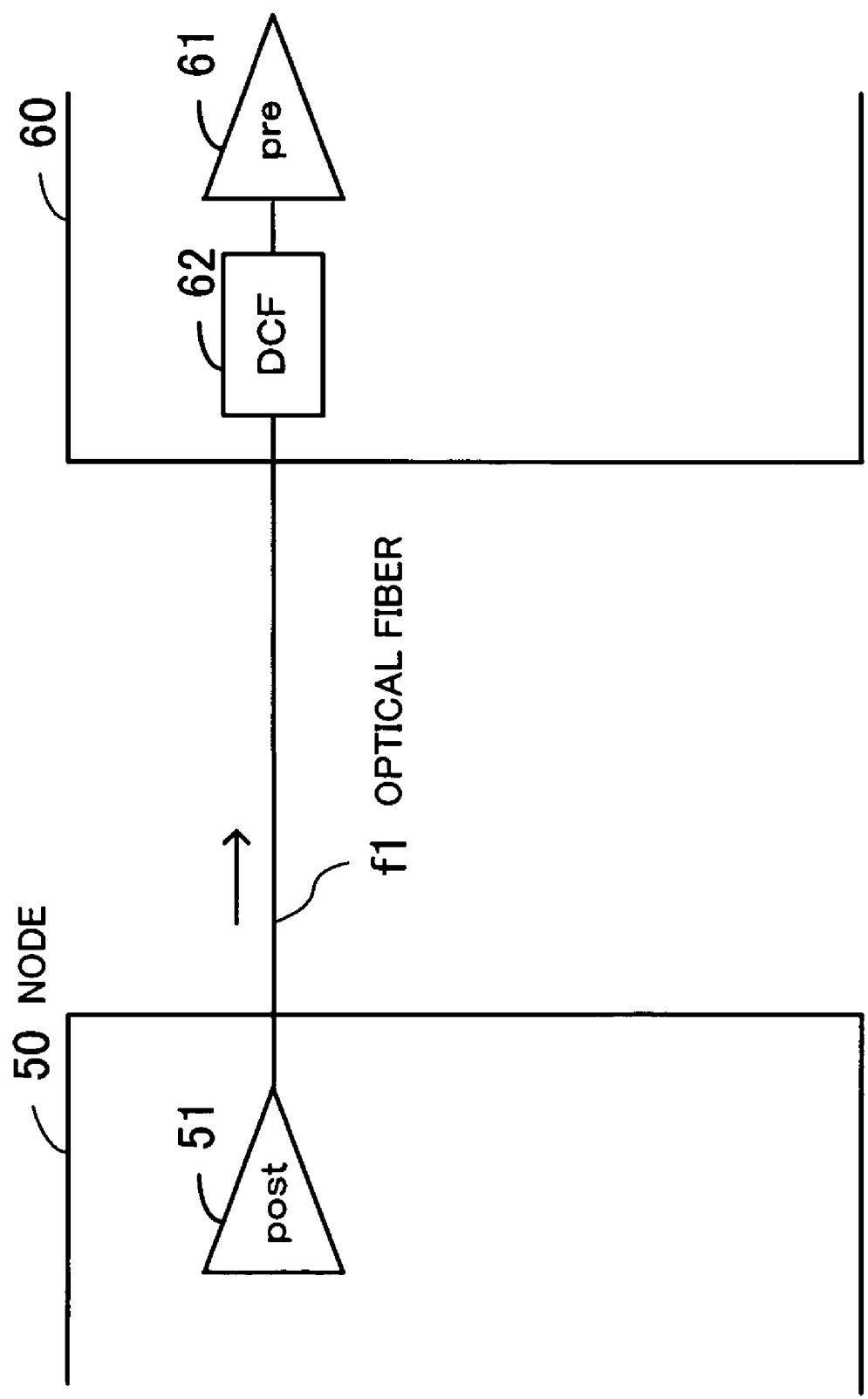
FIG. 12 shows a diagram conceptually describing a WDM system to make dispersion compensation by using a DCF.

FIG. 11 shows composing elements related to switching operations. As shown in FIG. 11, the node 20-3 includes a pre-amplifier 21, VIPA 22, optical switches 23a and 23b, switch controller 24c, VATT 25, controller 260, and spectrum detecting section 27. The spectrum detecting section 27 receives an optical signal output from the post-amplifier 11 to detect an optical spectrum and informs the switch controller 24c of which state the receiving light is put in, out of an INDOWN state, ASE light outputting state, WDM light outputting state. The switch controller 24c controls switching operations so as to select the bypass route R1 when the receiving light is in the INDOWN state or ASE light outputting state and to select the passage route R2 when the receiving light is in the WDM light outputting state.

The optical transmission system of the present invention is so configured as to control switching operations to select, in an amplifier booting mode, the bypass route without making noise light be input into the variable dispersion compensator and to select, in a working mode, the passage route by which an optical signal is input into the variable dispersion compensator to undergo dispersion compensation. By configuring as above, in the amplifier booting mode, it is made possible to boot the optical transmission system in a manner to provide high quality by using noise light without affecting adversely gain setting operations of the amplifier and, in the working mode, it is made possible to perform optical transmission by making high accurate dispersion compensation by using a variable dispersion compensator.

The foregoing is considered as illustrative only of the principles of the present invention. Further, since numerous modifications and changes will readily occur to those skilled in the art, it is not desired to limit the invention to the exact construction and applications shown and described and, accordingly, all suitable modifications and equivalents may be regarded as falling within the scope of the invention in the appended claims and their equivalents.

What is claimed is:

1. An optical transmission system for making transmission of an optical signal, comprising:

a first node having a post-amplifier to output noise light to an optical fiber in an amplifier booting mode and to amplify an optical signal and to output the amplified optical signal to an optical fiber in a working mode and an operational state informing unit to inform an operational state of the post-amplifier by using a monitoring control signal; and a second node having a pre-amplifier to receive the noise light and to do gain setting in the amplifier booting mode and to receive the optical signal and to amplify the received optical signal in the working mode, a variable dispersion compensator placed in a preceding-stage of the pre-amplifier to make, in a variable manner, compensation of dispersion of a wavelength caused by propagation of the optical signal through an optical fiber, a switching unit to select, when the noise light passes through the variable dispersion compensator, if a level of the noise light is deviated from a desired level, a bypass route so as to make the noise light not be input to the variable dispersion compensator but be input to the pre-amplifier according to a switching instruction in the amplifier booting mode and to select a passage route so as to make the optical signal, after having been input to the variable dispersion compensator and having undergone dispersion compensation, be input to the pre-amplifier according to a switching instruction in the working mode, and a switch controller to output, when the amplifier booting mode is recognized by the monitoring control signal, the switching instruction signal to select the bypass route and, in the working mode, to output the switching instruction signal for selection of the passage route.

2. The optical transmission system according to claim 1, wherein an optical attenuator is placed on the bypass route to accommodate variations in amounts of light loss occurring in the variable dispersion compensator so that a receiving level of the pre-amplifier occurring when one wave of the optical signal flows through the passage route is made equal to a receiving level of the pre-amplifier occurring when the noise light flows through the bypass route.

3. An optical transmission device for making transmission of an optical signal, comprising:

a pre-amplifier to receive noise light output from a post-amplifier in a preceding-stage node and to do gain setting in an amplifier booting mode and to receive an optical signal output from the post-amplifier and to amplify the optical signal in a working mode, a variable dispersion compensator placed in a preceding-stage of the pre-amplifier to make, in a variable manner, compensation of dispersion of a wavelength caused by propagation of the optical signal through an optical fiber, a switching unit to select, when the noise light passes through the variable dispersion compensator, if a level of the noise light is deviated from a desired level, a bypass route so as to make the noise light not be input to the variable dispersion compensator but be input to the pre-amplifier according to a switching instruction in the amplifier booting mode and to select a passage route so as to make the optical signal, after having been input to the variable dispersion compensator and having undergone dispersion compensation, be input to the pre-amplifier according to a switching instruction in the working mode; and a switch controller to output, when the amplifier booting mode is recognized by the monitoring control signal which was transmitted from the preceding-stage node and showed an operational state of the post-amplifier, the switching instruction signal to select the bypass route and to output the switching instruction signal to select the passage route in the working mode.

4. The optical transmission device according to claim 3, wherein an optical attenuator is placed on the bypass route to accommodate variations in amounts of light loss caused by an individual difference of the variable dispersion compensator so that a receiving level of the pre-amplifier occurring when one wave of the optical signal flows through the passage route is made equal to a receiving level of the pre-amplifier occurring when the noise light flows through the bypass route.

5. An optical transmission system for making transmission of an optical signal, comprising:
    a first node having a post-amplifier to output noise light to an optical fiber in an amplifier booting mode and to amplify an optical signal and to output the amplified optical signal in a working mode; and
    a second node having a pre-amplifier to receive noise light and to do gain setting in the amplifier booting mode and to receive an optical signal and to amplify the received optical signal in the working mode, a variable dispersion compensator placed in a preceding-stage of the pre-amplifier to make, in a variable manner, compensation of dispersion of a wavelength caused by propagation of the optical signal through an optical fiber, a light level detector to detect light levels on input and output sides of the variable dispersion compensator, a switching unit to select, when the noise light passes through the variable dispersion compensator, if a level of the noise light is deviated from a desired level, a bypass route, according to a switching instruction, so as to make the noise light not be input to the variable dispersion compensator but be input to the pre-amplifier in the amplifier booting mode and to select a passage route, according to a switching instruction, so as to make the optical signal, after having been input to the variable dispersion compensator and having undergone dispersion compensation, be input to the pre-amplifier in the working mode, and a switch controller to obtain a threshold value by estimating a receiving level of each of one wave of the optical signal and the noise light output from the post-amplifier from the light level and to recognize the amplifier booting mode or the working mode, based on the threshold value, and to output the switching instruction signal corresponding to each mode.

6. The optical transmission system according to claim 5, wherein an optical attenuator is placed on the bypass route to accommodate variations in amounts of light loss occurring in the variable dispersion compensator so that a receiving level of the pre-amplifier occurring when one wave of the optical signal flows through the passage route is made equal to a receiving level of the pre-amplifier occurring when the noise light flows through the bypass route.

7. An optical transmission device for making transmission of an optical signal, comprising:

a pre-amplifier to receive noise light output from a post-amplifier in a preceding-stage node and to do gain setting in an amplifier booting mode and to receive an optical signal output from the post-amplifier and to amplify the optical signal in a working mode, a variable dispersion compensator placed in a preceding-stage of the pre-amplifier to make, in a variable manner, compensation of dispersion of a wavelength caused by propagation of the optical signal through an optical fiber, a light level detector to detect light levels on input and output sides of the variable dispersion compensator, a switching unit to select, when the noise light passes through the variable dispersion compensator, if a level of the noise light is deviated from a desired level, a bypass route so as to make the noise light not be input to the variable dispersion compensator but be input to the pre-amplifier according to a switching instruction in the amplifier booting mode and to select a passage route so as to make the optical signal, after having been input to the variable dispersion compensator and having undergone dispersion compensation, be input to the pre-amplifier according to a switching instruction in the working mode; and a switch controller to obtain a threshold value by estimating a receiving level of each of one wave of the optical signal and the noise light output from the post-amplifier from the light level and to recognize the amplifier booting mode or the working mode, based on the threshold value, and to output the switching instruction signal in a manner to correspond to each mode.

8. The optical transmission device according to claim 7, wherein an optical attenuator is placed on the bypass route to accommodate variations in amounts of light loss occurring in the variable dispersion compensator so that a receiving level of the pre-amplifier occurring when one wave of the optical signal flows through the passage route is made equal to a receiving level of the pre-amplifier occurring when the noise light flows through the bypass route.

9. An optical transmission system for making transmission of an optical signal, comprising:
    a first node having a post-amplifier to output noise light to an optical fiber in an amplifier booting mode and to amplify an optical signal and to output the amplified optical signal to an optical fiber in a working mode; and
    a second node having a pre-amplifier to receive noise light and to do gain setting in the amplifier booting mode and to receive an optical signal and to amplify the received optical signal in the working mode, a variable dispersion compensator placed in a preceding-stage of the pre-amplifier to make, in a variable manner, compensation of dispersion of a wavelength caused by propagation of the optical signal through an optical fiber, a spectrum detector to detect an optical spectrum on an input side of the variable dispersion compensator, a switching unit to select, when the noise light passes through the variable dispersion compensator, if a level of the noise light is deviated from a desired level, a bypass route so as to make the noise light not be input to the variable dispersion compensator but be input to the pre-amplifier in the amplifier booting mode according to a switching signal and to select a passage route so as to make the optical signal, after having been input to the variable dispersion compensator and having undergone dispersion compensation, be input to the pre-amplifier in the working mode, and a switch controller to recognize the amplifier booting mode or the working mode based on the optical spectrum and to output the switching signal in a manner to correspond to each mode.

10. The optical transmission system according to claim 9, wherein an optical attenuator is placed on the bypass route to accommodate variations in amounts of light loss occurring in the variable dispersion compensator so that a receiving level of the pre-amplifier occurring when one wave of the optical signal flows through the passage route is made equal to a receiving level of the pre-amplifier occurring when the noise light flows through the bypass route.

11. An optical transmission device for making transmission of an optical signal, comprising:
- a pre-amplifier to receive noise light output from a post-amplifier in a preceding-stage node and to do gain setting in an amplifier booting mode and to receive an optical signal output from the post-amplifier and to amplify the optical signal in a working mode,
- a variable dispersion compensator placed in a preceding-stage of the pre-amplifier to make, in a variable manner, compensation of dispersion of a wavelength caused by propagation of the optical signal through an optical fiber,
- a spectrum detector to detect an optical spectrum on an input side of the variable dispersion compensator,
- a switching unit to select, when the noise light passes through the variable dispersion compensator, if a level of the noise light is deviated from a desired level, a bypass route so as to make the noise light not be input to the variable dispersion compensator but be input to the pre-amplifier in the amplifier booting mode according to a switching instruction and to select a passage route so as to make the optical signal, having been input to the variable dispersion compensator and having undergone dispersion compensation, be input to the pre-amplifier according to a switching instruction in the working mode;
- a switch controller to recognize the amplifier booting mode or the working mode based on the optical spectrum and to output the switching signal in a manner to correspond to each mode.

12. The optical transmission device according to claim 11, wherein an optical attenuator is placed on the bypass route to accommodate variations in amounts of light loss occurring in the variable dispersion compensator so that a receiving level of the pre-amplifier occurring when one wave of the optical signal flows through the passage route is made equal to a receiving level of the pre-amplifier occurring when the noise light flows through the bypass route.

* * * * *